BEST AVAILABLE COPY

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED NOVEMBER 19, 1968

856 O.G. 670

T856,035

733,811

ELECTRODEPOSITION OF PAINT ON SMALL PARTS

George E. F. Brewer, Novi, Mich., assignor to Ford Motor Company, Dearborn, Mich., a corporation of Delaware

Filed June 3, 1968. Published Nov. 19, 1968
Class 204—181
No Drawing. 8 Pages Specification

An improved method for simultaneously electro-depositing upon a plurality of small, electrically conductive objects, e.g. screws, bolts, brackets, coil springs, etc., an electrically resistant film of paint. This method comprises providing electrical connection between such objects and the external circuit of the electrode deposition cell with disposable connector-conductors, e.g. steel wool, wire mesh, or expanded metal, i.e. sheet metal which has been slitted and forcibly extended in one or more planes. The disposable connector-conductors may serve as retaining means for supporting the objects to be painted while the latter are immersed in the coating bath or the latter may be independently supported.